United States Patent
Urano et al.

(10) Patent No.: US 10,948,424 B2
(45) Date of Patent: Mar. 16, 2021

(54) DEFECT INSPECTION DEVICE, PATTERN CHIP, AND DEFECT INSPECTION METHOD

(71) Applicant: HITACHI HIGH-TECH CORPORATION, Tokyo (JP)

(72) Inventors: Yuta Urano, Tokyo (JP); Yukihiro Shibata, Tokyo (JP); Toshifumi Honda, Tokyo (JP); Yasuhiro Yoshitake, Tokyo (JP); Hideki Fukushima, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 163 days.

(21) Appl. No.: 16/080,283

(22) PCT Filed: Mar. 2, 2016

(86) PCT No.: PCT/JP2016/056330
§ 371 (c)(1),
(2) Date: Aug. 27, 2018

(87) PCT Pub. No.: WO2017/149689
PCT Pub. Date: Sep. 8, 2017

(65) Prior Publication Data
US 2019/0107498 A1    Apr. 11, 2019

(51) Int. Cl.
*G01N 21/956*    (2006.01)
*G01N 21/47*    (2006.01)
(Continued)

(52) U.S. Cl.
CPC .......... *G01N 21/956* (2013.01); *G01N 21/47* (2013.01); *G01N 21/8806* (2013.01);
(Continued)

(58) Field of Classification Search
CPC .................................................... G01N 21/956
(Continued)

(56) References Cited

U.S. PATENT DOCUMENTS 9,329,137 B2    5/2016  Shibata et al.
9,606,071 B2    3/2017  Shibata et al.
(Continued)

FOREIGN PATENT DOCUMENTS

| JP | 2003086544 A | 3/2003 |
|----|--------------|--------|
| JP | 2004207603 A | 7/2004 |
| JP | 2014174052 A | 9/2014 |

*Primary Examiner* — Tarifur R Chowdhury
*Assistant Examiner* — Omar H Nixon
(74) *Attorney, Agent, or Firm* — Miles & Stockbridge, P.C.

(57) ABSTRACT

In a defect inspection device that irradiates a surface of a sample or a surface of a pattern chip with an illumination light shaped to extend in a first direction, and detects a scattered light generated from the surface of the sample or the surface of the pattern chip by the illumination light to detect a defect on the surface of the sample, the pattern chip has a dot pattern area in which multiple dots are arrayed in multiple rows and multiple columns, a minimum interval between the dots corresponding to the lines aligned in the first direction among the multiple dots arrayed in the dot pattern area in a second direction orthogonal to the first direction is smaller than a width of the illumination light, and a minimum interval between the multiple dots arrayed in the dot pattern area is larger than a resolution of the detection optical system.

18 Claims, 12 Drawing Sheets

(51) Int. Cl.
  *G01N 21/88* (2006.01)
  *G06T 7/00* (2017.01)
  *G01N 21/17* (2006.01)
(52) U.S. Cl.
  CPC ..... *G01N 21/95607* (2013.01); *G06T 7/0004* (2013.01); *G01N 2021/1765* (2013.01); *G01N 2021/8825* (2013.01); *G06T 2207/30108* (2013.01)
(58) Field of Classification Search
  USPC ........................................................ 356/338
  See application file for complete search history.

(56) References Cited

U.S. PATENT DOCUMENTS

| | | | |
|---|---|---|---|
| 2003/0022465 A1 | 1/2003 | Wachtler | |
| 2005/0052643 A1* | 3/2005 | Lange | G01N 21/8806 356/237.1 |
| 2005/0219518 A1* | 10/2005 | Korngut | G01N 21/4788 356/237.2 |
| 2006/0007531 A1* | 1/2006 | Korengut | G01N 21/9501 359/362 |
| 2008/0117630 A1* | 5/2008 | Durvasula | G02F 1/133611 362/246 |
| 2009/0002695 A1* | 1/2009 | Saito | G01N 21/9501 356/237.4 |
| 2010/0328649 A1* | 12/2010 | Ota | G01B 11/25 356/73 |
| 2013/0082177 A1* | 4/2013 | Hiroi | H01J 37/28 250/310 |
| 2013/0114078 A1* | 5/2013 | Honda | G01N 21/8806 356/364 |
| 2015/0369752 A1* | 12/2015 | Honda | G01N 21/8851 356/237.2 |
| 2016/0123894 A1* | 5/2016 | Fu | G01N 21/8806 356/615 |

* cited by examiner

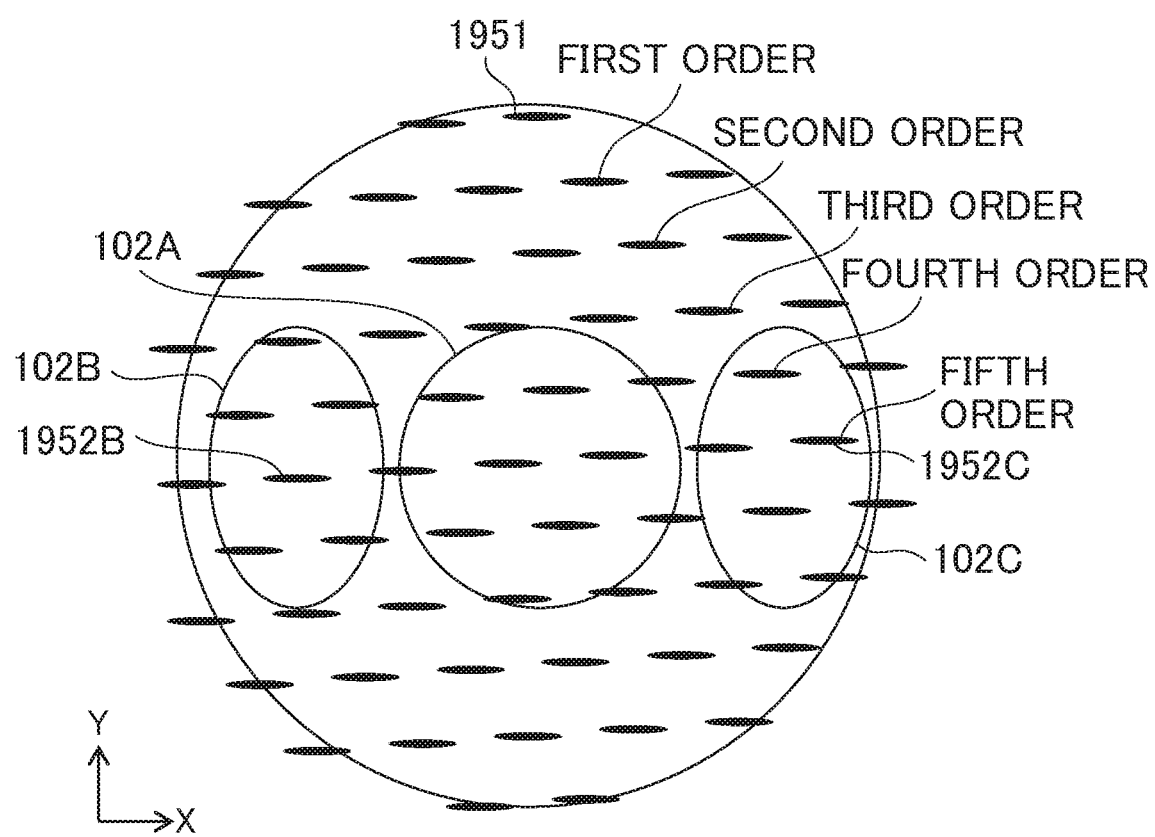

DEFECT INSPECTION DEVICE, PATTERN CHIP, AND DEFECT INSPECTION METHOD

TECHNICAL FIELD

The present invention relates to a defect inspection device that inspects a defect generated in a pattern of an object, a pattern chip used in the device, and a defect inspection method executed in the device.

BACKGROUND ART

For example, a semiconductor device, a liquid crystal display element, and a printed circuit; board are manufactured by forming a pattern on a substrate. In a manufacturing process for the semiconductor device, the liquid crystal display element, and the printed circuit board, in order to inspect a defect occurring at the time of forming the pattern and take countermeasures against the defect, a defect inspection device that detects a defect occurrence condition is used.

The defect inspection device of this type is disclosed in Patent Literature 1. Patent Literature discloses "a defect inspection device for inspecting a sample, including a table unit, an illumination light irradiation unit, a detection optical system unit, and a signal processing unit in which the table unit is movable and allows a sample to be inspected and a pattern chip to be placed on the table unit, the illumination light irradiation unit irradiates a surface of the sample placed on the table unit or a surface of the pattern chip with an irradiation light linearly formed, the detection optical system unit includes a plurality of detection optical systems each having an objective lens and an image sensor and placed at a plurality of locations above the table unit, and forms on the image sensors and detects images caused by scattered lights incident to the respective objective lenses of the plurality of detection optical systems placed at the plurality of locations, among scattered lights generated from the sample irradiated with the linearly formed illumination light by the illumination light irradiation unit, and the signal processing unit processes signals detected by the plurality of detection optical systems of the detection optical system unit to detect a defect of the simple surface, wherein a plurality of repetitive patterns for generating the scattered lights corresponding to positions of the respective objective lenses of the multiple detection optical systems in the detection optical system unit when the linearly formed illumination light is irradiated by the illumination light irradiation unit is periodically formed in the pattern chip"(claim 1 of scope of claims).

CITATION LIST

Patent Literature

Patent Literature 1: Japanese Unexamined Patent Application Publication No. 2014-174052

SUMMARY OF INVENTION

Technical Problem

Patent Literature 1 discloses a defect inspection device capable of stably matching a focal point of illumination light and a focal point of multiple detection systems within respective focal depths. A pattern chip disclosed in Patent Literature 1 has a pattern corresponding to a detection system in an oblique direction, and the pattern is a line and space pattern which is not orthogonal to a longitudinal direction of an illumination beam which is elongated in one direction. Therefore, an area having a finite width where an illumination area of a linear illumination light having a certain width overlaps with the line and space pattern is detected as an image in a detection system in an oblique direction. For that reason, in the adjustment of a focal position of the detection system in the oblique direction, since a spread of the image having the finite width due to defocus and a change in peak strength are measured, a change in the image when the amount of defocus is small was small, resulting in a problem that the focal position could not be adjusted with high precision.

Therefore, it is an object of the present invention to provide a technique in which an optical system including an illumination optical system that irradiates a linear illumination light and multiple detection optical systems which detect a scattered light except for a specularly reflected light from a sample can be adjusted with high precision.

Solution to Problem

In order to solve the problem described above, the present invention employs, for example, configurations defined in claims. The present specification includes multiple solution to the problem, and an example of the solutions is directed to "In a defect inspection device that irradiates a surface of a sample or a surface of a pattern chip with an illumination light shaped to extend in a first direction, and detects a scattered light generated from the surface of the sample or the surface of the pattern chip by the illumination light to detect a defect on the surface of the sample, the pattern chip has a dot pattern area in which multiple dots are arrayed in multiple rows and multiple columns, a minimum interval (dx) between the dots corresponding to the lines aligned in the first direction among the multiple dots arrayed in the dot pattern area in a second direction orthogonal to the first direction is smaller than a width of the illumination light, and a minimum interval (d) between the multiple dots arrayed in the dot pattern area is larger than a resolution of the detection optical system.

Advantageous Effects of Invention

According to the present invention, the optical system including the illumination optical system that irradiates the linear illumination light and the multiple detection optical systems that detect the scattered light except for the specularly reflected light from the specimen can be adjusted with high accuracy, and a stable defect inspection can be realized with high sensitivity. Other problems, configurations and advantages other than those described above will be clarified by the following description of the embodiments.

BRIEF DESCRIPTION OF EMBODIMENTS

FIG. 14 is a schematic diagram showing a relationship between a diffracted light distribution by the doc pattern area used in the third embodiment and an opening position of a detection optical system.

DESCRIPTION OF EMBODIMENTS

Hereinafter, embodiments of the present invention will be described with reference to the accompanying drawings. The embodiments of the present invention are not limited to embodiments described later, and various modifications are enabled within a scope of the technical idea of the embodiments.

(1) First Embodiment

Figure 1:
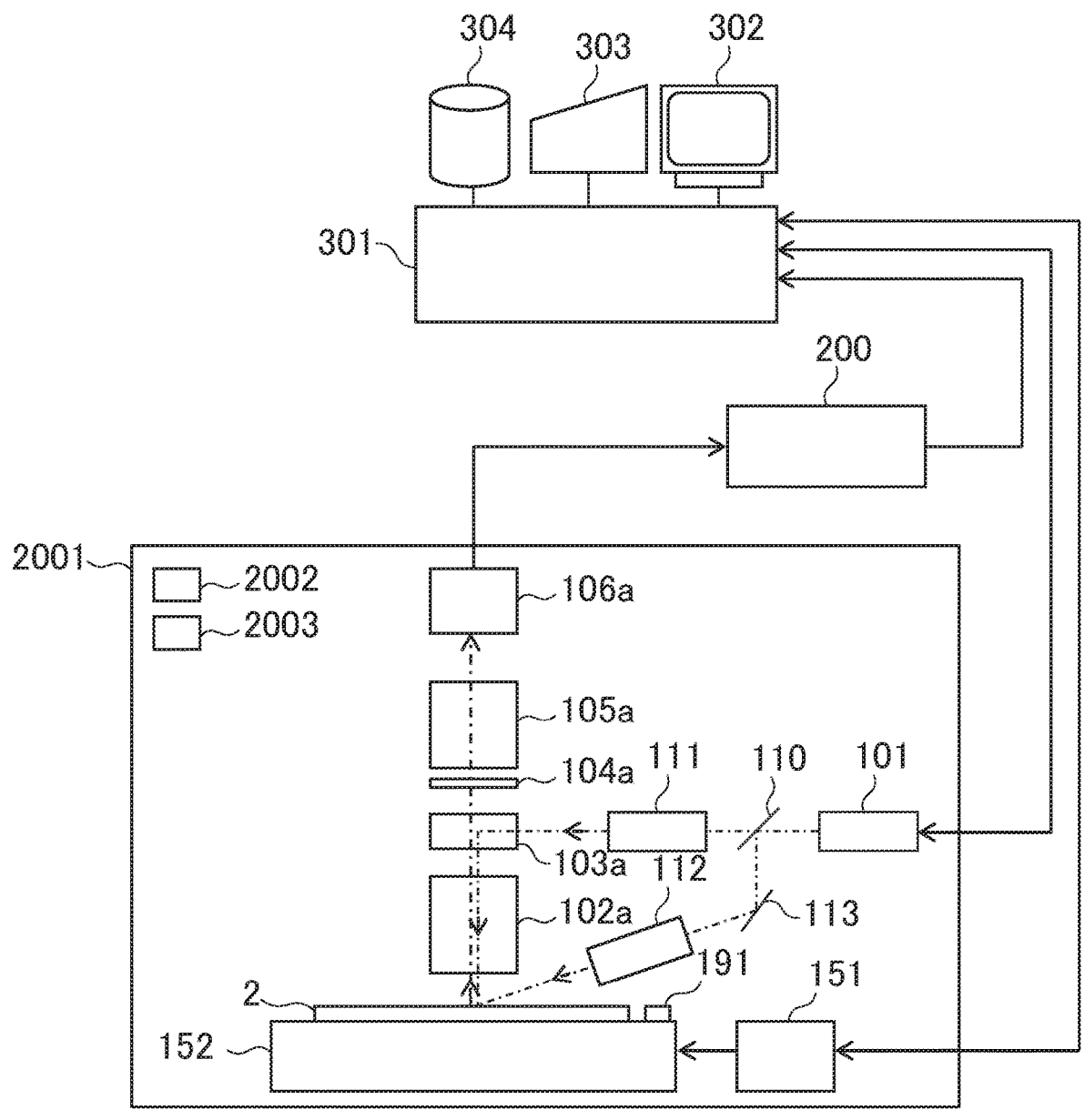
FIG. 1 is a diagram showing a schematic configuration of a defect inspection device according to a first embodiment.

FIG. 1 show's a configuration example of a defect inspection device 1000 according to the present embodiment. The defect inspection device 1000 includes a light source unit 101, a TTL illumination optical system 111, an oblique illumination optical system 112, an objective lens 102, an objective pupil optical unit 103, a polarizer 104, an imaging lens 105, a detector 106, a signal processing unit 200, an overall control unit 301, a display unit 302, an arithmetic unit 303, a storage unit 304, a stage drive unit 151, an X-Y-Z-θ stage 152 (.hereinafter referred to as "stage 152"), and a pattern chip 191.

An illumination light emitted from the light source unit 101 is reflected by a mirror 110 and an optical path of the reflected illumination light is bent toward a mirror 113. The illumination light incident on the mirror 113 is further reflected and incident on the oblique illumination optical system 112. The oblique illumination optical system 112 linearly condenses the incident illumination light. An inspection target substrate 2 is irradiated with the linearly-condensed illumination light from obliquely above the inspection target substrate 2. In this example, the mirror 110 can enter and exit the optical path of the illumination light emitted from the light source unit 101. When the mirror 110 is moved to a position deviated from the optical path of the illumination light, the illumination light enters the TTL illumination optical system ill. The illumination light incident on the TTL illumination optical system 111 is linearly-condensed and enters the objective pupil optical unit 103 and an optical path of the illumination light is bent in a direction of the objective lens 102. The inspection target substrate 2 is irradiated with the illumination light having passed through the objective lens 102 from a normal direction of the inspection target substrate 2.

A specularly reflected light, a diffracted light, and a scattered light (hereinafter those lights are collectively referred to as "reflected light") are generated by irradiating the inspection target substrate 2 with an oblique illumination light having passed through the oblique illumination optical system 112 or a vertical illumination light having passed through the TTL illumination optical system 111. After the specularly reflected light, the diffracted light, and the scattered light have entered the objective lens 102 and have been condensed, those lights are imaged on a detection surface of the detector 106 through the objective pupil optical section 103, the polarizer 104, and the imaging lens 105 in order and converted into an electric signal. It should be noted that the polarizer 104 may be disposed between the imaging lens 105 and the detector 106 and immediately before the detector 106. In addition, the polarizer 104 has a rotation mechanism and a mechanism that retreats to the outside of an optical axis. The rotation mechanism can set the polarizer 104 to an arbitrary light inspection angle. The retreating mechanism can switch the polarizer 104 between use and nonuse.

An electric signal output from the detector 106 is input to the signal processing unit 200. The signal processing unit 200 is basically configured by a computer. In other words, the signal processing unit 200 includes an input/output device, a storage device, a control device, an arithmetic device, and so on. The signal processing unit 200 discriminates whether a defect is present or not, by comparing an electric signal corresponding to an inspection area with an electric signal obtained from another area on the inspection target substrate 2, and outputs information on the detected defect. The feature amount and position information of the defect including a signal intensity of the defect detected by the signal processing unit 200 are stored in the storage unit 304 through the overall control unit 301 and also displayed on the display unit 302. The inspection target substrate 2 is scanned by the stage 152 driven by the stage drive unit 151 and an entire surface of the inspection target substrate 2 is inspected.

In FIG. 1, only one detection optical system (configured by the objective lens 102, the objective pupil optical unit 103, the imaging lens 105, and the detector 106) of the defect inspection device 1000 is illustrated, but actually, multiple detection optical systems are installed so that the objective lenses 102 do not mechanically interfere with each other. In the drawing, reference symbol "a" indicates that the objective lens 102, the objective pupil optical unit 103, the imaging lens 105, and the detector 106 belong to the detection optical system of some system. Therefore, the signal processing unit 200 actually processes the multiple electric signals detected through the multiple detection optical systems to determine a defect.

A temperature gauge 2002 and a barometer 2003 for monitoring a temperature and a pressure are installed in a device internal space 2001 in which an illumination optical system and a detection optical system are installed and a measured value of an environmental condition in the device internal space 2001 is always transmitted to the overall control unit 301.

Figure 2:
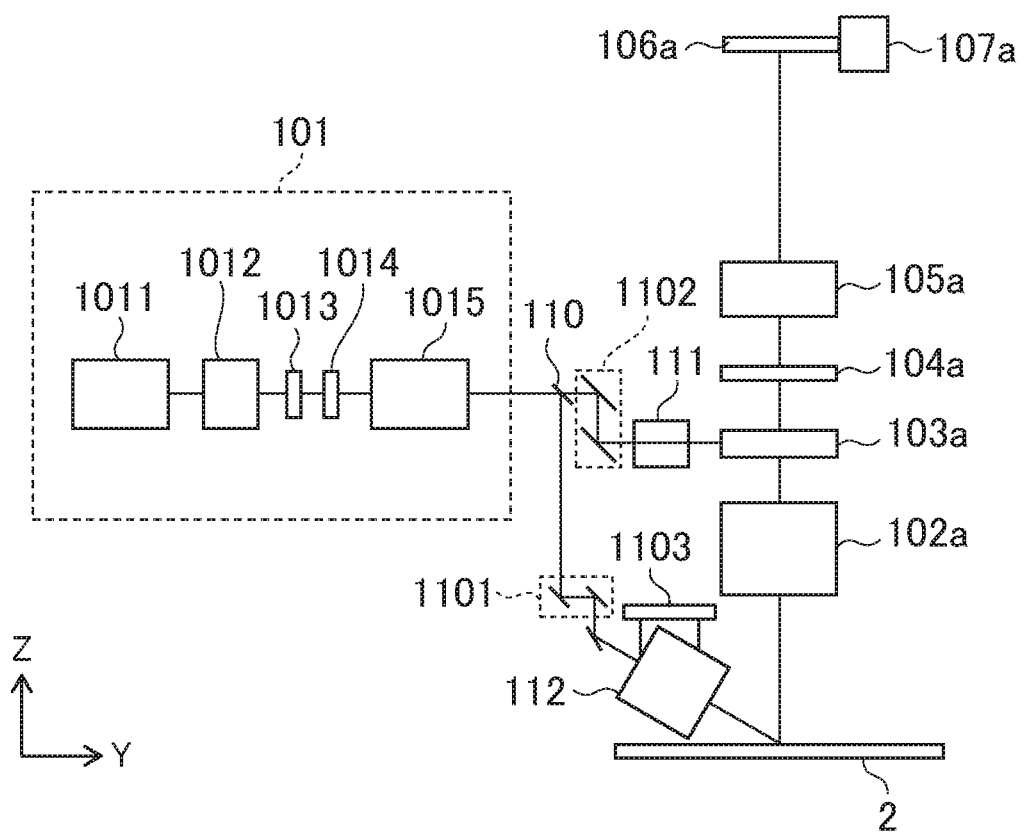
FIG. 2 is a side view showing a detailed configuration of an illumination optical system and a vertical detection optical system according to the first embodiment.

FIG. 2 shows a more detailed configuration of the illumination optical system and the detection optical system.

The light source unit 101 includes a laser light source 1011, an attenuator 1012, an ND filter 1013, a wavelength plate 1014, and a beam expander 1015. An output of a laser oscillated and output from the laser light source 1011 is adjusted by the attenuator 1012, the light amount of laser is adjusted by the ND filter 1013, a polarization state of the laser is adjusted by the wavelength plate 1014, and a beam diameter and a shape of the laser are adjusted and controlled by the beam expander 1015. Then, the laser is emitted as an illumination light.

An optical path of the illumination light emitted from the light source unit 101 is guided to the TTL illumination optical system 111 or the oblique illumination optical system 112 depending on whether the mirror 110 is present or not. In other words, when the mirror 110 that has been moved by a drive device not shown is installed at a position deviating from an optical path of the illumination light, the illumination light emitted from the light source unit 101 enters the TTL illumination optical system 111 through the mirror unit 1102. On the other hand, in the case where the mirror 110 that has been moved by the drive device not shown is installed on the optical path of the illumination light, the illumination light emitted from the light source unit 101 is reflected by the mirror 110, is incident on the mirror unit 1101, further reflected by the mirror unit 1101, and enters the oblique illumination optical system 112. The illumination light incident on the TTL illumination optical system 111 or the oblique illumination optical system 112 is shaped into a light beam that is elongated in one direction and then emitted from the TTL illumination optical system 111 or the oblique illumination optical system 112.

A short wavelength, a high output, a high luminance and a high stability are suitable for the laser light source 1011, and the laser light source 1011 using the third, fourth, or fifth harmonic of a YAG laser (respective wavelengths are 355, 266, and 213 nm) or the like is employed. An angle and a position of the illumination light incident on the oblique illumination optical system 112 or the TTL illumination optical system 111 are controlled by the mirror unit 1101 or 1102, respectively, and are adjusted so that the inspection target substrate 2 is irradiated with the illumination light illuminated at a desired position. The mirror units 1101 and 1102 are each configured by multiple plane mirrors, and the angle and the position of the illumination light are adjusted by adjusting the angle and the position of the plane mirror.

Figure 3:
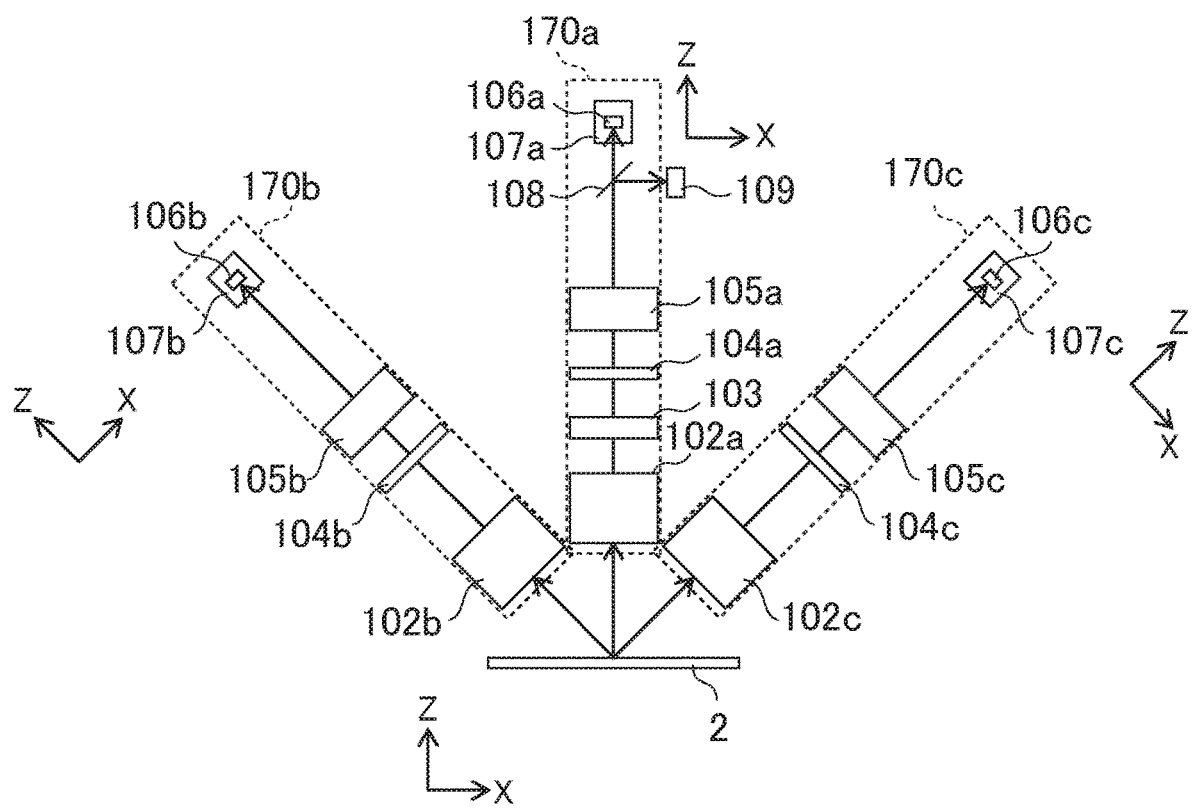
FIG. 3 is a side view showing a configuration and a placement of a detection optical system according to a first embodiment.

FIG. 3 shows a placement relationship of the multiple detection optical systems. A vertical detection optical system 170a includes an objective lens 102a, a polarizer 104a, an imaging lens 105a, and a detector 106a. The vertical detection optical system 170a forms an image caused by a reflected light condensed by the objective lens 102a after generated from the inspection target substrate 2 on the detector 106a, to thereby detect the reflected light. A left oblique detection optical system 170b includes an objective lens 102b, a polarizer 104b, an imaging lens 105b, and a detector 106b. The left oblique detection optical system 170b forms an image caused by a reflected light condensed by the objective lens 102b after generated from the inspection target substrate 2 on the detector 106b, to thereby detect the reflected light. A right oblique detection optical system 170c includes an objective lens 102c, a polarizer 104c, an imaging lens 105c, and a detector 106c. The right oblique detection optical system 170c forms an image caused by a reflected light condensed by the objective lens 102c after generated from the inspection target substrate 2 on the detector 106c, to thereby detect the reflected light.

The vertical detection optical system 170a includes an objective pupil optical unit 103 and guides the vertical illumination light to the inspection target substrate 2. The vertical detection optical system 170a further includes a mirror 108 inser table into and retractable from the optical path and a two-dimensional detector 109 which is at a conjugate position with the detector 106a. The two-dimensional detector 109 can detect a two-dimensional image which is substantially the same image plane as that of the detector 106a. The mirror 103 is a half mirror or a total reflection mirror. When the half mirror is used, signals from the detector 106a and the two-dimensional detector 109 can be detected at the same time.

The detectors 106a, 106b, and 106c are held by stages 107a, 107b, and 107c, respectively. The detectors 106a, 106b, and 106c are configured by CCD linear image sensors, CMOS linear image sensors, or the like. The stages 107a, 107b, and 107c each have translation mechanisms of X, Y and Z and a biaxial rotation mechanism, and adjust the position and posture (azimuth angle, tilt angle) of the detector by those mechanisms. The adjustment is performed so that an azimuth direction and an image plane of the image formed in an illumination area $R_I$ to be described later by the respective detection optical systems in a longitudinal direction coincide with an azimuth direction and a light receiving surface of the detectors 106a, 106b, and 106c in the longitudinal direction. The azimuth angle is a rotation angle in a plane perpendicular to the optical axis of each detection optical system, and the tile angle is an inclination angle to a plane perpendicular to the optical axis.

Figure 4:
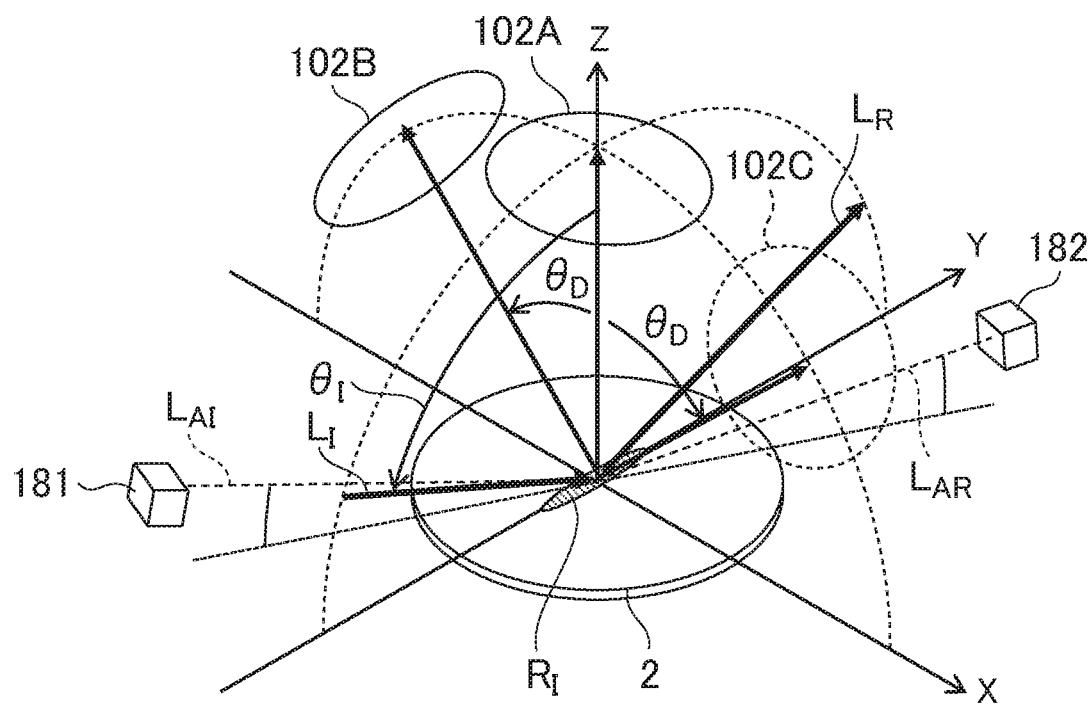
FIG. 4 is a perspective view showing a positional relationship between an incident direction of an oblique illumination on an inspection target substrate and detection directions of multiple detection optical systems.

FIG. 4 shows a relationship between an irradiation direction of the oblique illumination light to the inspection target substrate 2 and a detection direction (detection opening position) of the detection optical system. It is assumed that an incident direction of the oblique illumination light output by the oblique illumination optical system 112 on the inspection target substrate 2 is $L_I$ and a reflection direction of the oblique illumination light by the inspection target substrate 2 is $L_R$. It is assumed that an illumination area on the inspection target substrate 2 which is irradiated with the oblique illumination light or the vertical illumination light is $R_I$. An opening (an area in a direction of the reflected light condensed by the objective lens 102a in the reflected light from the inspection target substrate 2) is represented by 102A, an opening of the left oblique detection optical system 170b is represented by 102B, and an opening of the right oblique detection optical system 170c is represented by 102C.

When an XYZ coordinate system is set such that $L_I$ and $L_R$ are present in a YZ plane, a center of the opening 102A is in a Z axis direction. At that time, the centers of the openings 102 B and 102 C are present in an XZ plane and placed in a direction inclined by $\theta_D$ from the Z axis. The oblique illumination optical system 112 and the TTL illumination optical system 111 form a linear illumination beam (irradiation area $R_I$) parallel to the Y axis on the inspection target substrate 2. With the above placement, the specularly reflected light ($L_R$) of the oblique illumination light does not enter the detection optical system (170a, 170b, 170c). In addition, since the optical axis of each of the detection optical systems (170a, 170b, 170c) is orthogonal to the longitudinal direction of the illumination area $R_I$, the image can be focused over the entire area of the illumination area $R_I$. Since the detection optical systems (170a, 170b, 170c) do not detect the specularly reflected light but detect only the diffracted light and the scattered light, a flat area on the inspection target substrate 2 becomes a dark state, and only an uneven shape (circuit pattern, foreign matter, or the like) emitting the diffracted light or the scattered light is detected. As a result, the defect inspection can be performed with high sensitivity. Further, the image is focused over the entire area of the illumination area $R_I$, as a result of which a clear image without blur is obtained over the entire area of the illumination area $R_I$. Therefore, the defect inspection can be performed with high speed and high sensitivity.

An AF illumination beam emitted from an autofocus (AF: autofocus) illumination system 181 is reflected by the inspection target substrate 2 through an optical path $L_{AI}$ and received by an AF light receiving system 182 through an optical path $L_{AR}$. The AF illumination system 181 has a light source and a projection lens and projects a slit-shaped image onto the inspection target substrate 2. The AF light receiving system 182 has a light receiving lens and a position sensitive element (PSD: position sensitive detector) and measures a position of the slit image. The AF light receiving system 182 measures a displacement of the slit image due to a vertical movement of the inspection target substrate 2 to measure the vertical movement of the inspection target substrate 2. A measurement signal is input to the overall control unit 301 and the stage drive unit 151 and used for adjustment of the illumination optical system and detection optical system of the defect inspection device 1000, and adjustment of a height (Z) of the inspection target substrate 2 by the stage 152.

Instead of the AF illumination system 181 and the AF light receiving system 182, an AF illumination and light receiving system having a light source, a projection lens, a light receiving lens, and a position detection element is disposed at a position of the AF illumination system 181. A reflection mirror is disposed at a position of the AF light receiving system 182. An AF illumination beam emitted by the AF illumination and light receiving system is reflected by the reflection mirror, and again received the AF illumination and light receiving system to measure a variation in the slit image during reciprocation, thereby being capable of measuring a height of the inspection target substrate 2 with higher precision.

In the case of the placement of the illumination optical system and the detection optical system, unless a concavo-convex pattern is present in the illumination area $R_I$, a signal caused by the illumination light cannot be detected in the detection optical system, and the illumination optical system and the detection optical system can be adjusted based on the signal. On the other hand, if a sample having the concavo-convex pattern is placed at substantially the same position as that of the inspection target substrate 2 and a detection signal derived from the sample is measured, the diffracted light and the scattered light generated from the illumination area $R_I$ can be detected by the detection optical system and the illumination optical system so that the detection optical system can be adjusted. A structure having the concavo-convex pattern is the pattern chip 191.

Figure 5:
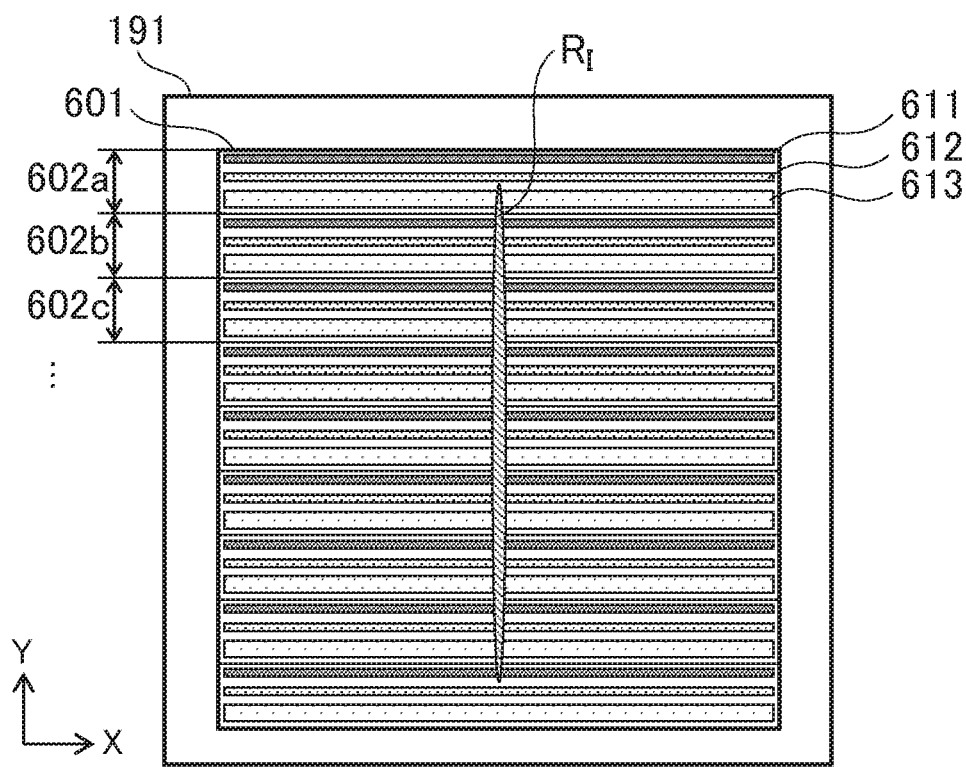
FIG. 5 is a plan view showing a configuration example of a pattern chip used in the first embodiment.

FIG. 5 shows a configuration example of the pattern chip 191. The illumination optical system and the detection optical system are adjusted with the use of the concave and convex pattern of the pattern chip 191, as a result of which the illumination optical system and the detection optical system can be adjusted under the same condition irrespective of the pattern of the inspection target substrate 2, and the optical system can be kept in a stable state for a long period of time.

In order to adjust the optical system under the condition close to a condition at the time of inspecting the inspection target substrate 2, it is desirable that the pattern chip 191 is installed in the vicinity of the inspection target substrate 2 so that a height of a surface of the pattern chip 191 is substantially equal to that of the inspection target substrate 2. When the surface height of the inspection target substrate 2 is different from the surface height of the pattern chip 191, a height Z of the stage 152 is corrected with the use of a difference in height between the surfaces of the inspection target substrate 2 and the pattern chip 191 so that the height of the detection target pattern is set to be substantially equal between at the time of the adjustment using the pattern chip 191 and at the time of inspection of the inspection target substrate 2.

The pattern chip 191 has a concavo-convex pattern for generating the diffracted light and the scattered light in a pattern area 601 of the surface. In FIG. 5, a longitudinal direction of the linearly shaped illumination area $R_I$ is defined as a Y direction, and a width direction (direction orthogonal to the longitudinal direction) of the illumination area $R_I$ is defined as an X direction. The pattern area 601 has multiple small pattern areas 602a, 602b, 602c, and so on aligned in the Y direction.

Area sizes of the small pattern areas 602a, 602b, 602c, and so on and patterns formed in those small pattern areas are common to each other. Hereinafter, those small pattern areas 602a, 602b, 602c, and so on are collectively referred to as "small pattern areas 602". A length of the small pattern area 602 in the Y direction is shorter than a length of the illumination area $R_I$ in the Y direction (for example, 1/4 or less). Therefore, the multiple small pattern areas 602 are included within a range of the illumination area $R_I$ in the Y direction. For example, four or more small pattern areas 602 are included in the illumination area $R_I$. As a result, in the small pattern areas 602 (four or more areas) of the illumination area $R_I$ in the Y direction, the adjustment of the illumination optical system and the detection optical system to be described later can be carried out with the use of the common pattern. This makes it possible to reduce a variation in an adjustment state depending on a position in the Y direction within the illumination area $R_I$ (that is, the position within a detection visual field) and reduce a variation in sensitivity.

Each of the small pattern areas 602 includes a dot one-row pattern area 611, a line and space (hereinafter referred to as "L & S") pattern area 612, and a dot pattern area 613.

In FIGS. 4 and 5, the illumination area $R_I$ is shown as an ellipse for the sake of convenience. Actually, the illumination area RI has an elliptical Gaussian distribution in which an intensity distribution of the illumination light is elongated in the Y direction, and an area in which a relative intensity relative to a distribution center is $1/e^2$ or more corresponds to the illumination area $R_I$. A width of the illumination area $R_I$ is a light condensing width of the Gaussian distribution condensed in the X direction and with the use of the linear illumination light in the illumination area $R_I$ which is narrow and thin, a detection resolution and an illumination power density in the X direction can be enhanced, thereby being capable of realizing a defect inspection with high sensitivity. A width of the illumination area $R_I$ in the X direction ranges from 0.5 μm to 1.5 μm. The narrower width is advantageous to higher sensitivity, but there is a need to increase an aperture angle for condensing the illumination, which makes it difficult to keep the stability of the inspection because the depth of focus becomes narrow. In practical use, the width is appropriately about 0.8 μm.

Figure 6:
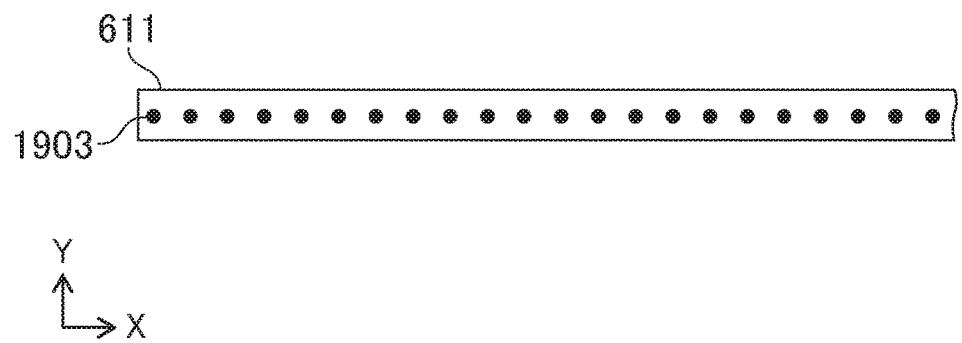
FIG. 6 is a plan view showing a configuration example of a dot single-row pattern area used in the first embodiment.

FIG. 6 shows a configuration example of the dot one-row pattern area 611. The dot one-row pattern area 611 is obtained by aligning the same dot pattern as that in the L &

S pattern area 612 in a straight line at predetermined intervals in the X direction, Each black circle corresponds to a dot 1903. Intervals of the dots 1903 within the dot one-row pattern area 611 in the X direction are smaller than a width of the illumination area $R_I$ and a pixel dimension of the detectors 106a, 106b, and 106c in the X-direction. For that reason, regardless of a relative position of the illumination area $R_I$ with respect to the dot row in the X direction, a signal derived from any dot is detected to measure a detection position of the dot row in the Y direction by each of the detectors 106a, 106b, and 106c.

Figure 7:
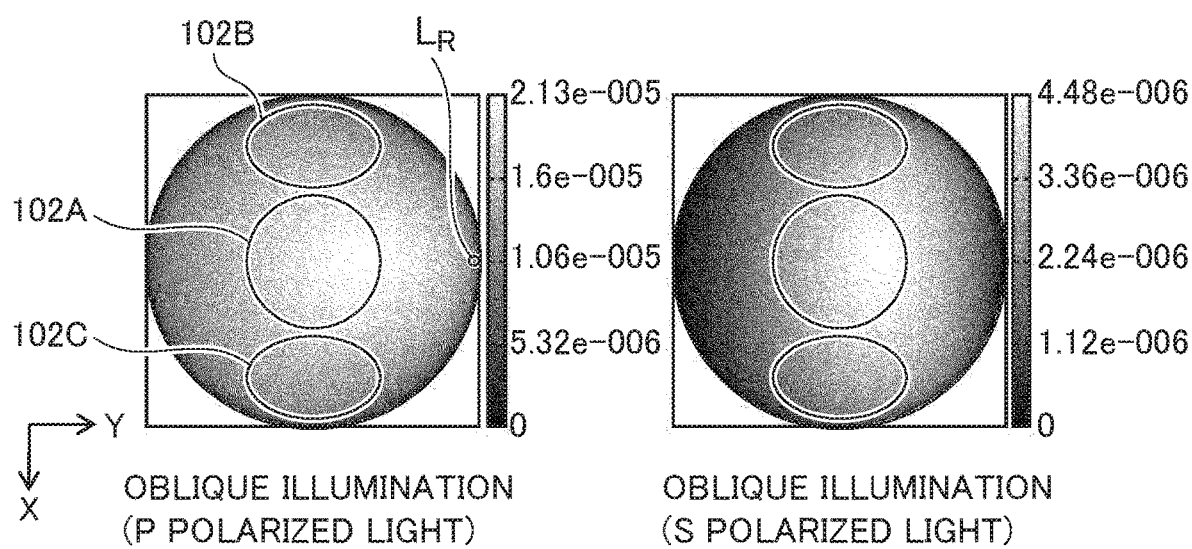
FIG. 7 is a diagram showing a color map of a scattered light distribution calculation result by dots of the pattern chip used in the first embodiment and an opening position of the detection optical system.

The scattered light of the dot pattern in the dot one-row pattern area 611 appears almost, evenly in all directions as shown in FIG. 7. Therefore, the scattered light can be detected by all of the detection optical systems (170a, 170b, and 170c). In the detectors 106a, 106b, and 106c, intervals of the signals in the Y direction of the plural dot one-row pattern areas 611 arrayed in the Y direction are proportional to magnifications of the respective detection optical systems. For that reason, the magnifications of the respective detection optical systems can be adjusted to desired values with reference to the detected intervals of the dot one-row pattern area 611 in the Y direction.

Further, the positions of the signals of the dot one-row pattern area 611 in the Y direction in the detectors 106a, 106b, and 106c are measured, and combined together among the multiple detectors, thereby being capable of combining the positions (Y-direction positions of the detection target areas on the pattern chip 191) of the detectors 106a, 106b, and 106c in the Y direction together. As a result, the signals obtained by detecting the same location on the inspection target substrate 2 by the detectors 106a, 106b, and 106c can be subjected to comparison and integration processing, thereby being capable of improving the inspection sensitivity.

The L & S pattern area 612 is configured by multiple line patterns which are aligned at predetermined pitches in the Y direction and are elongated in the X direction. When the line pattern in the X direction is irradiated with the oblique illumination light or the vertical illumination light, the intense diffracted light and scattered light are generated in the XZ plane. Since the signal in the L & S pattern area 612 is strongly detected by the vertical detection optical system 170a, the signal is used for the adjustment of the vertical detection optical system 170a and the adjustment of the obiique illumination optical system 112 and the TT1 illumination optical system 111 based on the signal detected by the vertical detection optical system 170a.

On the other hand, the signal of the L & S pattern area 612 is weak in the oblique detection optical system (170b, 170c). For that reason, the adjustment of the oblique detection optical system (170b, 170c) is performed with the use of the signals of the dot one-row pattern area 611 and the dot pattern area 613.

FIG. 3 shows an example of the configuration of the dot pattern area 613. Black circles in the figure correspond to the individual dots 1903. The dot pattern area 613 is configured such that a minimum repetition unit area 1902 is repetitively arrayed in two dimensions (X direction and Y direction). The minimum repetition unit area 1902 is an elongated area in the Y direction. The multiple dots in the area are disposed linearly so as to be mirror symmetric with respect to a center position in the Y direction. The configuration in which the minimum repetition unit areas 1902 are aligned only in the X direction is drawn in FIG. 8 for the limitation of a paper space. In this way, the minimum repetition unit area 1902 is a repetition basic unit.

Figure 8:
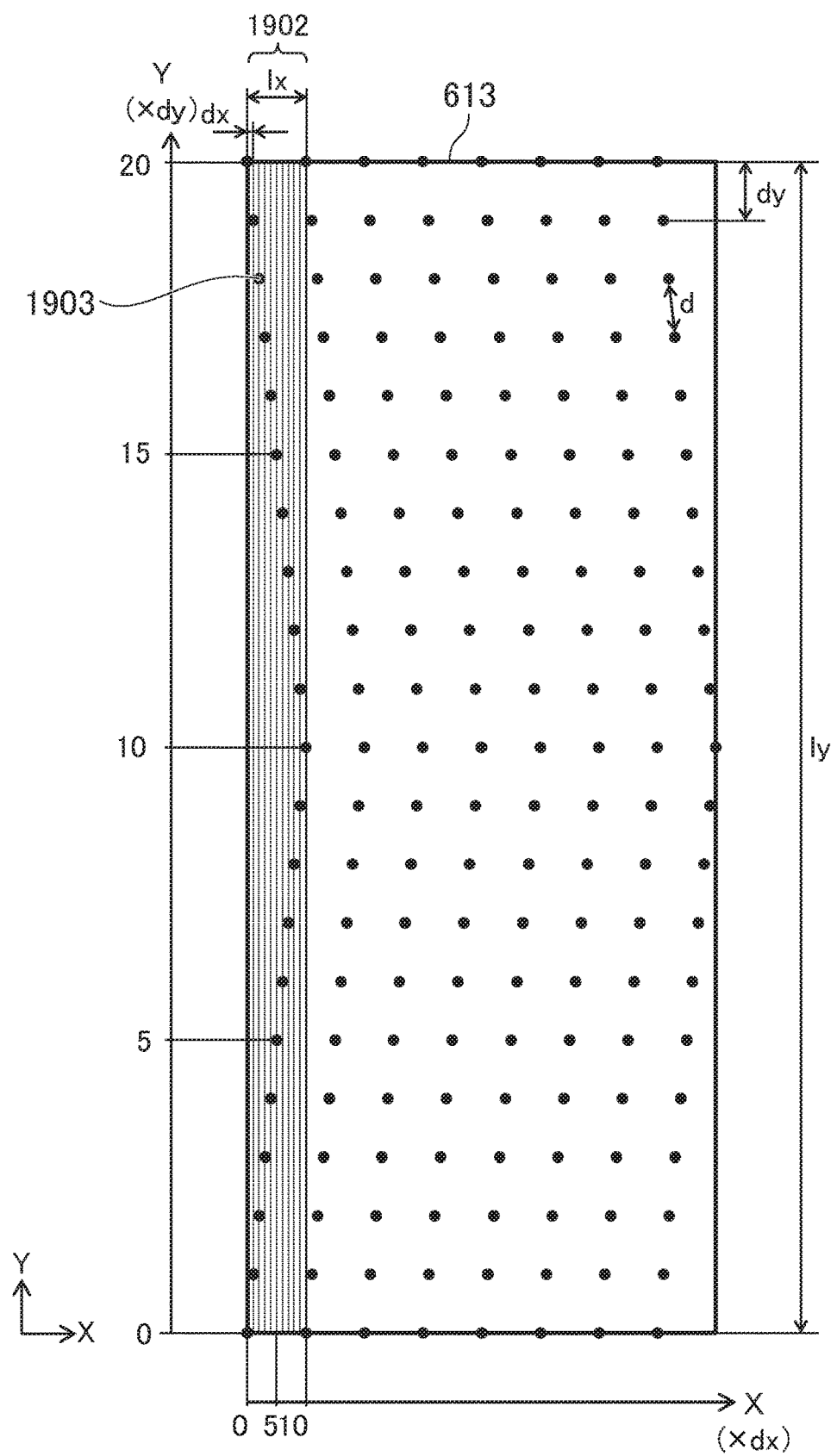
FIG. 8 is a plan view showing a configuration example of a dot pattern area used in the first embodiment.

In this example, a minimum interval of the dots 1903 in the X direction in the minimum repetition unit area 1902 is defined as dx and an interval in the Y direction is defined as dy. As shown in FIG. 8, dx corresponds to a minimum interval of the multiple dots in the X direction, which correspond to each of the rows aligned in the Y direction. In addition, a length of the minimum repetition unit area 1902 in the X direction is defined as 1x and a length in the Y direction is defined as 1y.

A size of the dot pattern area 613 is M×N times the minimum repetition unit area 1902. M is the number in the X direction and N is the number in the Y direction. As usual, M is about 2,000 to 10,000 and N is about 5 to 50. An example of preferable parameters is dx=0.1 μm, dy=1 μm, and (M, N)=(5000, 10). In that case, a size of the minimum repetition unit area 1902 is 1x×1y=1 μm×20 μm (X direction×Y direction), and a size of the dot pattern area 613 is 5 mm×200 μm.

The dot pattern area 613 increases more in the X direction as the number of repetitions M in the X direction is larger, and the fine adjustment of the position of the illumination area $R_I$ in the X direction becomes unnecessary. In particular, when the pattern chip 191 is irradiated with the illumination light in an ultraviolet area which is short in a wavelength, the pattern formed on the pattern chip 191 is deteriorated by being damaged by irradiation with the illumination light. The deterioration changes the intensity and distribution of the scattered light generated from the pattern, as a result of which an adjustment state of the optical system adjustment, using the pattern chip 191 is changed. Thus, irradiation with the illumination light in the ultraviolet area suffers from a problem of impairing the stability of the inspection performance.

On the other hand, in the present embodiment, the dot pattern area 613 is elongated in the X direction and a large number of the same patterns (that is, the minimum repetition unit area 1902) are present in the X direction. For that reason, in the case of the pattern chip 191 according to the present embodiment, an installation position of the pattern chip 191 is merely displaced in the X direction relative to the linear illumination area Rx, thereby being capable of executing the same adjustment operation as that before displacement. Therefore, the installation position of the pattern chip 191 is displaced periodically in the X direction, thereby being capable of preventing the pattern chip 191 from being damaged by irradiation of the illumination light in the ultraviolet area for a long period of time. Alternatively, another area of the pattern chip 191 which is not deteriorated is used without the use of the deteriorated area on the pattern chip 191, thereby being capable of executing the stable adjustment for a long period of time.

A width Ix of the minimum repetition unit area 1902 in the X direction is larger than a width of the illumination area $R_I$ in the X direction (for example, 0.8 μm). In addition, only one dot 1903 is present in the same Y coordinate within the minimum repetition unit area 1902. Those conditions make it possible to prevent the overlapping signals of the multiple dots from being detected when detecting the dot pattern area 613 by the linear image sensors (detector 106a, 106b, and 106c) elongated in the Y direction.

The individual dots 1903 are configured by substantially circular concave or convex patterns patterned on a silicon substrate by focused ion beam processing, electron beam processing, laser processing, photolithography, or the like, a substantially circular opaque pattern formed on a transparent substrate such as synthetic quartz, or the like.

The scattered light is generated from the dot 1903 by the illumination light from the oblique illumination optical system and is detected by the detection optical system. A diameter of the circular pattern may fall within a range of 0.05 µm to 0.2 µm, and preferably, example, 0.1 µm. For example, when the wavelength of the illumination light is 266 nm, since a circular pattern with a diameter of 0.1 µm is sufficiently smaller than the illumination wavelength, the circular pattern is detected as an image similar to a point pattern having substantially no length.

In the case where a processing device used for processing the pattern does not correspond to the processing of the circular pattern, a regular quadrangle or a regular hexagon having the same size as that of the circular pattern, a shape approximated to a circle by combining minute triangles or quadrangles together, or the like can be substituted for the circular pattern. If a difference between those substitute shapes and the ideal circular pattern is smaller than the wavelength of the illumination light, a spatial resolution at the time of detection, or a processing resolution of the processing device, the substitute shape patterns function in the same manner as that of the circular pattern.

Returning to the description of FIG. 7, as described above, FIG. 7 shows an angular distribution of the scattered light by the dot pattern A great circle in FIG. 7 indicates that; the illumination direction shown in FIG. 4 and the opening position of the detection optical system are placed on a celestial sphere centered on an origin of the X, Y, and Z axes shown in FIG. 4. Further, a hemisphere having Z of 0 or more is projected on the XY plane and displayed. FIG. 7 shows the respective positions of a tip of the vector $L_R$ indicating the specularly reflected light direction of the oblique illumination light and the openings 102A, 102B, and 102C of the detection optical system. FIG. 7 shows the angular distribution (calculated value by simulation) of the scattered light intensities of the cylindrical concave dot pattern with a diameter of 0.1 µm and a depth of 0.1 µm. The illumination is an oblique illumination with a wavelength of 266 nm and S- and P-polarized lights.

In order to detect the scattered light of the dot pattern by each detection optical system and perform the adjustment, it is desirable that the openings 102A, 102B, and 102C of the detection optical system are distributed widely over the entire area so as to obtain sufficient detection signal intensity. In addition, in order to detect and measure the defocus of the detection optical system with high accuracy, it is desirable that the distribution of the scattered light uniformly spreads inside the openings 102A, 102B, and 102C of the individual detection optical systems as compared with the case in which the distribution of the scattered light is locally biased in the openings 102A, 102B, and 102C. The distribution of the scattered light shown in FIG. 7 satisfies those conditions. The distribution of the scattered light of the dot pattern is distributed almost uniformly on the celestial sphere because the size of the dot; pattern is shorter than the wavelength and scattering which can be approximated by Rayleigh scattering occurs.

In the polarized light of illumination light, the P-polarized light has a larger scattered light intensity than that of the S-polarized light. For that reason, it is preferable to use the P-polarized light when the dot pattern is irradiated with the oblique illumination light to perform the adjustment. In consideration of the convex pattern of the same cylindrical shape, it is known that the P-polarized illumination has a larger scattering intensity than that of the S-polarized light, but the scattered light intensity is biased around the specular reflection ($L_R$). On the other hand, in the case of the concave pattern, as shown in FIG. 7, in the P-polarized illumination larger in the scattered light intensity, the scattered light spreads evenly around the position of the opening 102A. For that reason, the concave pattern is more preferable than the convex pattern.

Figure 9:
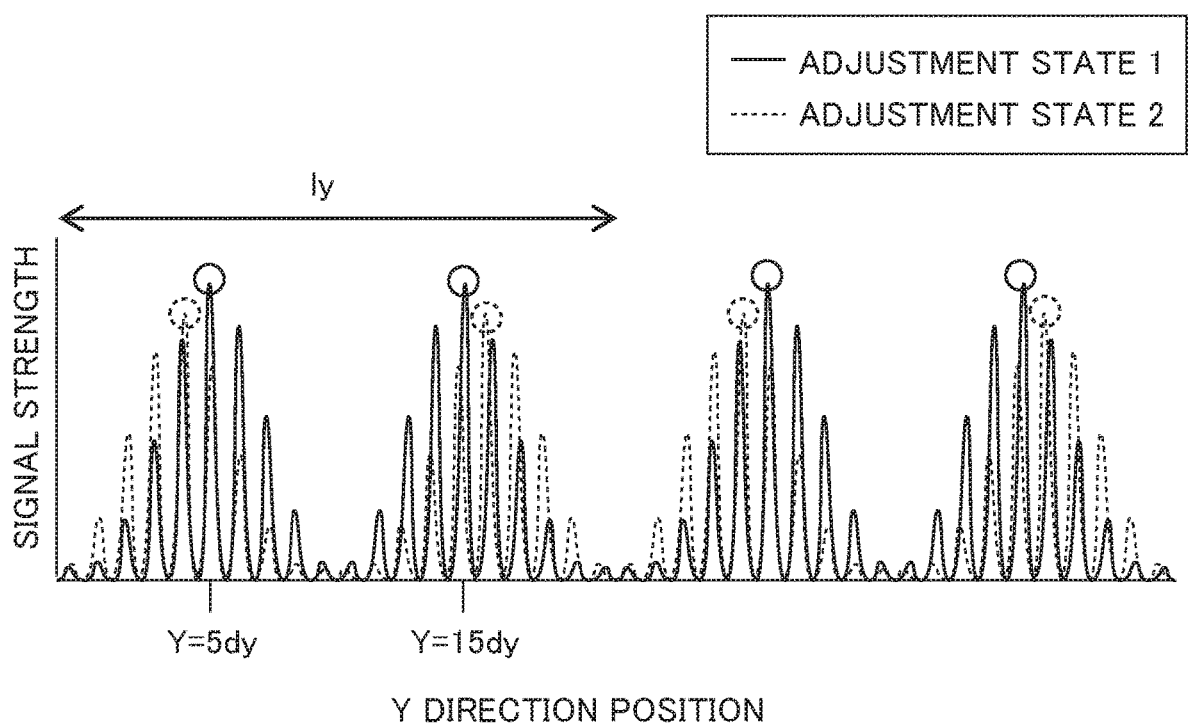
FIG. 9 is a diagram showing a waveform of a detection signal obtained from a dot pattern area of the pattern chip according to the first embodiment.

FIG. 9 shows the waveform of the detection signal obtained when the dot pattern area 613 is irradiated with the vertical illumination light or the oblique illumination light, and the dot pattern area 613 is detected by the detection optical system (170a, 170b, or 170c). In FIG. 8, let us consider a situation (adjustment state 1 in FIG. 9) in which the center position of the illumination area in the width direction (X direction) is in the vicinity of X=5 dx. As described above, when the width of the illumination area $R_I$ in the X direction is 0.8 µm, dx=0.1 µm, dy=1 µm, and 1y=20 µm, since the signal of the dot pattern to be detected is proportional to the illumination intensity at the position of the dot, the signal intensity of the dots 1903 of Y=5 dy and 15 dy close to the center of the illumination area $R_I$ is largest. If the center of the illumination area $R_I$ is located at X=4 dx (adjustment state 2 in FIG. 9), the dots 1903 of Y=4 dy and 16 dy approach the center of the $R_I$, and those dot signal intensities are maximal. Conversely speaking, if the signal of the portion with the largest signal corresponds to the signal of the dot 1903 closest to the center of the illumination area $R_I$ in the X direction.

In the present embodiment, since the dot interval dx in the X direction is 0.1 µm and is sufficiently smaller than the width of the illumination area $R_I$ in the X direction, almost equivalent signal intensity (maximum value) can be measured for all of the dots located in the center of the illumination area $R_I$.

In the present embodiment, the interval dy of the dots in the Y direction is 1 µm and the interval d between the closest dots is 1.005 µm, and since both of those intervals is larger than the spatial resolution (depending on the wavelength and the number of openings of the detection optical system, for example, 0.7 to 0.9 µm at a wavelength of 266 nm) of the detection optical system, the detection signals of neighboring dots do not overlap with each other as shown in FIG. 9, and the detection intensities of individual dots can be measured with high accuracy.

The detection signals of the neighboring dots do not overlap with each other ideally as described above, but because a bottom of a point image distribution function of the detection optical system overlaps with the adjacent dots, the placement of the adjacent dots may affect the detection signals of the individual dots. During the actual adjustment, the spatial resolution of the detection optical system is low in the defocused state, as a result of which the scattered light of a certain dot may interfere with and affect the scattered light of the close dot. Since a way of the influence of interference depends on the array of the dots, in the case where the array of the dots is asymmetrical, there is a risk that a difference in the adjustment state is present between the left oblique detection optical system 170b and the right oblique detection optical system 170c.

Meanwhile, the minimum repetition unit area 1902 according to the present embodiment has an array relationship in which the dot pattern in the area from 0 to 10 dy and the dot pattern in the area from 10 dy to 20 dy are mirror symmetric in the Y direction. For that reason, even when the influence of the interference between the neighborhood dots appears, the influence of the right and left asymmetry is canceled, and a difference can be prevented from occurring in adjustment state between the left oblique detection optical system 170b and the right oblique detection optical system 170c.

In the case of FIG. 9, in an adjustment state 1, the center of the illumination area $R_I$ is X=5 dx and the detection optical system is focused, whereas in an adjustment state 2, the center of the illumination area RT is X=4 dx and the detection optical system is out of focus. The focusing of the detection optical system makes the waveform of the dot detection signal sharper and increases the peak intensity. This can be discriminated because the maximum intensity of the dot detection signal (portions indicated by circles in FIG. 9) has a relationship of the adjustment state 1>the adjustment state 2.

If the interval dx of the dot array in the X direction is equal to or greater than the width of the illumination area $R_I$ or if the signal of the isolated dot is used as an adjustment reference, it is difficult to discriminate whether an increase or decrease in the peak intensity of the dot is caused by defocus of the detection optical system or caused by a change in relative position of the dot to the illumination area $R_I$ in the X direction. This makes it difficult to adjust the focus of the detection optical system with high accuracy.

On the other hand, in the dot pattern area 613 according to the present embodiment, since the dot pattern array is sufficiently small in in the interval dx in the X direction, the detection optical system can be adjusted with high accuracy without being affected by the position variation of the illumination area $R_I$.

There are cases in which individual dot detection signals are not stable because the peak intensity is varied due to a slight variation in noise of the sensor or the imaging state of the detection optical system. However, the dots closest to the center position of the illumination area $R_I$ are present at 2M locations in the dot pattern area 613. Therefore, when, for example, an average value of the dot signal intensities at M' (M' is 2 or more and 2M or less) locations of the higher dot signal intensity is set as an evaluation value, even if the peak intensity of the individual dot signals is varied, the stable adjustment result can be obtained with a reduction in the influence of the variation in the peak intensity.

Figure 10:
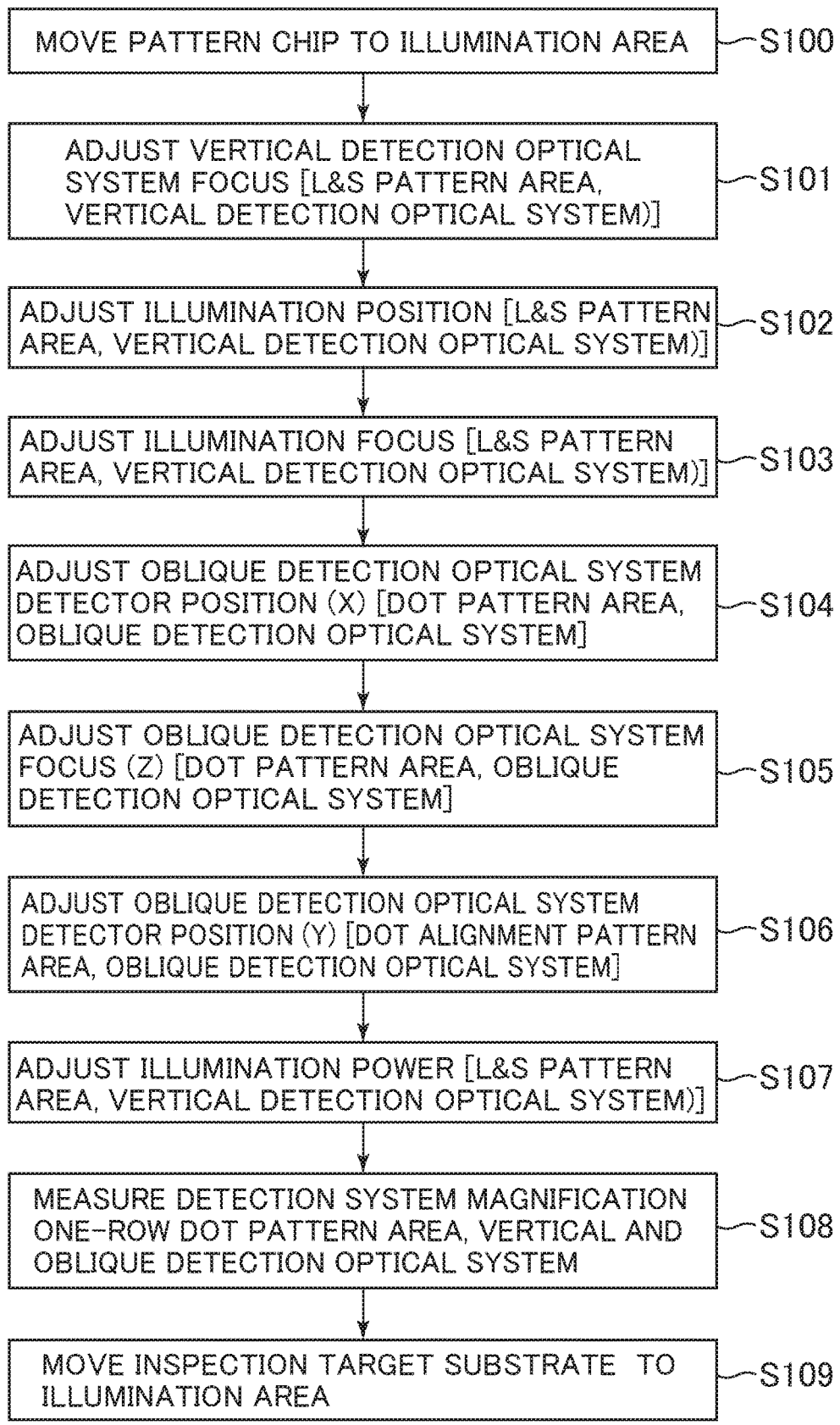
FIG. 10 is a flowchart showing an adjustment procedure of an optical system using the pattern chip according to the first embodiment.

FIG. 10 shows an adjustment procedure of the illumination optical system and the detection optical system using the pattern chip 191. In this example, an adjustment procedure of the oblique illumination optical system and the detection optical system is shown. However, the same procedure can be performed for adjustment also in the combination of the vertical illumination optical system and the detection optical system. The respective steps in FIG. 10 show the details of the adjustment to be carried out at each stage, the pattern area used for the measurement, and the detection optical system for obtaining the detection signal. The sequence will be described in order below. A sequence of processing is executed by the overall control unit 301.

First, the pattern chip 191 is moved by the stage 152 and placed in the illumination area $R_I$ of the illumination optical system (that is, the position to be inspected by the detection optical system) (Step S100). Next, the focal, point of the vertical detection optical system 170a is adjusted with the use of a signal obtained by detecting the L & S pattern area 612 with the vertical detection optical system 170a (Step S101). Next, the position of the illumination area $R_I$ in the X direction with the illumination optical system 112 is adjusted with the use of the signal obtained by detecting the L & S pattern area 612 by the vertical detection optical system 170a (Step S102). Subsequently, the focus of the illumination light by the oblique illumination optical system 112 is adjusted with the use of a signal obtained by detecting the L & S pattern area 612 with the vertical detection optical system 170a (Step S103).

Further, the positions of the detectors (106b, 106c) of the oblique detection optical systems (170b, 170c) in the X direction are adjusted with the use of a signal obtained by detecting the dot pattern area 613 with the oblique detection optical systems (170b, 170c) (Step S104). Next, the focuses (that is, the z direction position of the detectors 106b and 106c) of the oblique detection optical systems (170b, 170c) are adjusted with the use of a signal obtained by detecting the dot pattern area 613 with the oblique detection optical systems (170b, 170c) (Step S105). Subsequently, the positions of the detectors (106b, 106c) of the oblique detection optical systems (170b, 170c) in the Y direction are adjusted with the use of a signal obtained by detecting the dot one-row pattern area 611 with the oblique detection optical systems (170b, 170c) (Step S106).

Thereafter, the power measurement and adjustment of the illumination light are performed with the use of a signal, obtained by detecting the L & S pattern area 612 with the vertical detection optical system 170a (Step S107). Next, optical magnifications of the detection optical systems (170a, 170b, 170c) are measured with the use of a signal obtained by detecting the dot one-row pattern area 611 with the detection optical systems (170a, 170b, 170c) (Step S108). Thereafter, the inspection target substrate 2 is moved to the illumination area $R_I$ (Step S109).

In order to adjust the position and focus of the illumination light, the detection optical system is required to be in focus. For that reason, the focus adjustment (Step S101) of the detection optical system is first performed as described above. The oblique detection optical system has the optical axis inclined with respect to the pattern chip 191 and is in focus only at a specific X direction position. For that reason, the focus of the vertical detection optical system is adjusted and used for adjusting the state of the illumination light. The vertical detection optical system enables the detection of the pattern signals of both the L & S pattern area 612 and the dot pattern area 613. However, when the L & S pattern area 612 is used, there is advantageous in that the signal processing for extracting the dots located in the vicinity of the center of the illumination area $R_I$ as described in FIG. 9 is not required.

The two-dimensional detector 109 is fixed at a designed image plane position by the objective lens 102a and the Imaging lens 105a. The Z position of the pattern chip 191 is adjusted according to the detection signal of the L & S pattern area 612 with the two-dimensional detector 109 so that an intensity change in the Y direction comparable to an edge of the line pattern becomes clearer, to thereby adjust the focus of the vertical detection optical system 170a. Note that the Z position of the two-dimensional detector 109 and the Z position of the detector 106a in conjunction with the Z position the two-dimensional detector 109 may be adjusted. With execution of Step S101, the Z position of the pattern chip 191 is fixed to a position where the vertical detection optical system 170a is in focus.

In Step S102, the X position of the illumination area $R_I$ is adjusted by the optical axis adjustment with the mirror unit 1101 so as to be set to a position at which the signal of the detector 106a is maximized. In Step S103, the stage 1103 causes the oblique illumination optical system 112 to move in the optical axis direction to adjust the focus so that the width of the illumination area $R_I$ measured by the two-dimensional detector 109 becomes equal to or less than a predetermined va1ue.

A state in which the illumination area R_I by the illumination optical system coincides with the detection visual field of the detection optical system (the X direction positions of the detectors 106a, 106b, and 106c) and the respective optical systems are in focus in the illumination area RT is realized in Steps S100 to S109 described above.

In that state, adjustment parameters such as the height measurement values of the inspection target substrate 2 by the AF illumination system 181 and the AF light receiving system 182, the height 2 setting value of the stage 152, the setting value of the adjustment mechanism (the mirror unit 1101, the stage 1103) of the oblique illumination optical system, the position setting values of the detectors 106a, 106b, and 106c, an adjustment completion time, the environmental conditions at that time (a temperature, an atmospheric pressure and so on in the device internal space 2001) are recorded, and input to and saved in the overall control unit 301.

Figure 11:
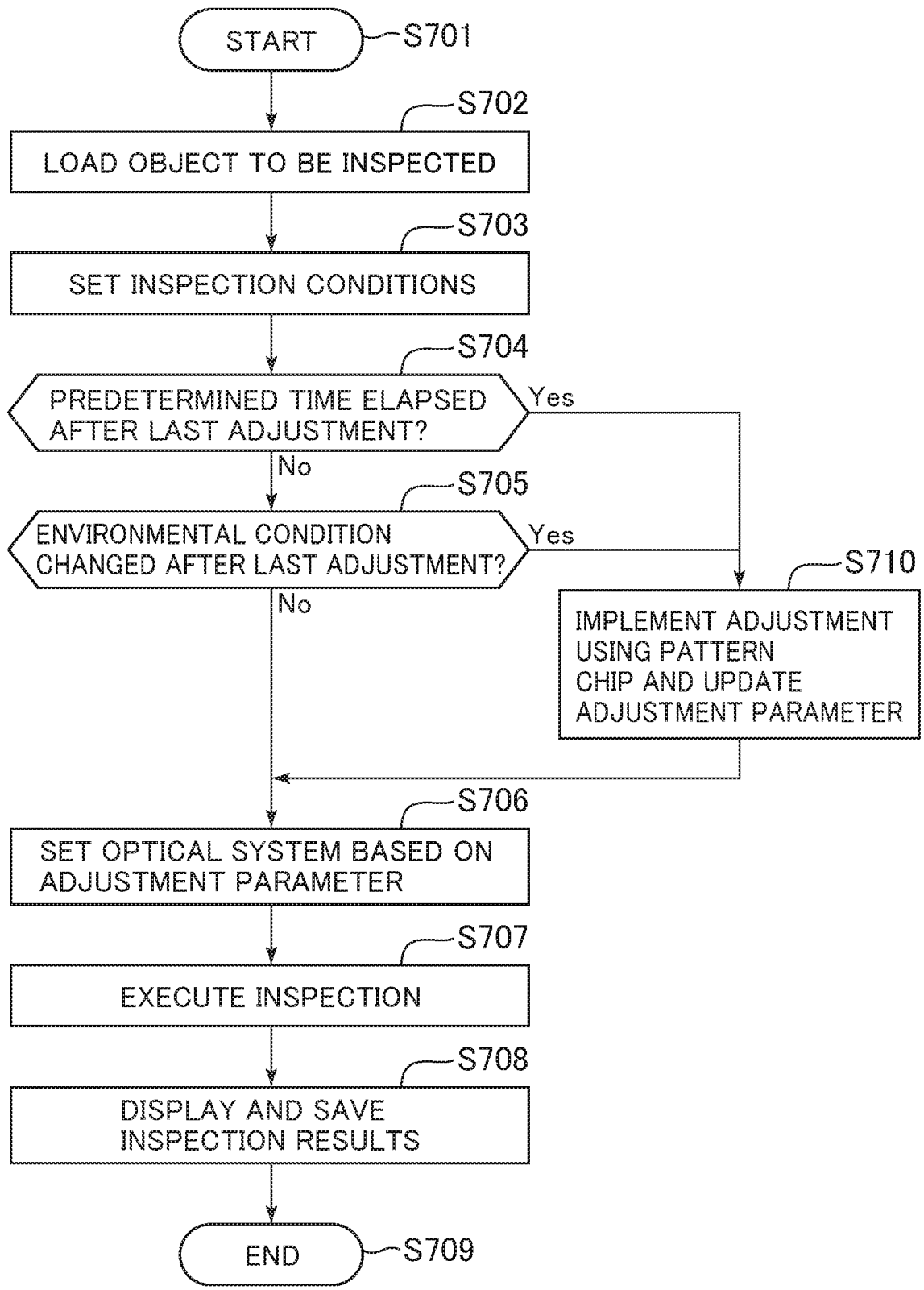
FIG. 11 is a flowchart showing an inspection procedure including adjustment of the optical system by the defect inspection device according to the first embodiment.

FIG. 11 shows an inspection procedure to be executed in the defect inspection device 1000. The processing is executed by the signal processing unit 200 and the overall control unit 301. First, an inspection object (Inspection target substrate 2) is loaded into the device, and installs on the stage 152 (Step S702). Next, the inspection conditions are set (Step S703). The inspection conditions include the illumination condition (for example, illumination angle: oblique direction/vertical direction/both of oblique direction and vertical direction) and the detection conditions (for example, each of the vertical detection optical system, the left oblique detection optical system, and the right oblique detection system is used or not). Next, the illumination optical system and the detection optical system are adjusted and set (Steps S704 to S706, Step S710).

The target of adjustment and setting is the illumination optical system and the detection optical system selected to be used in Step S703. First, an elapsed time since the last adjustment of the target optical system is obtained, and it is determined whether or not a predetermined period of time during which the state can be maintained after completion of the adjustment (Step S704). If the predetermined period of time has elapsed, the process proceeds to Step S710. If the predetermined time has not elapsed, it is determined whether or not a change in the environmental conditions after the previous adjustment (a temperature change, an atmospheric pressure change, and so on in the device internal space 2001) exceeds a predetermined threshold value (Step S705). If the change exceeds a threshold, the process proceeds to Step S710. If not exceeding, the illumination optical system and the detection optical system are set based on the adjustment parameters saved at the previous adjustment (Step S706). Next, the inspection is executed (Step S707), the inspection results are saved and displayed (Step S708), and the inspection is terminated (Step S709).

If any one of the determinations in Steps S704 and S705 is Yes, the adjustment of the optical system using the pattern chip is performed and the adjustment parameter is updated. If a negative determination is made in neither Step S704 nor Step S705, the optical system is set with the use of the adjustment parameters obtained by the adjustment using the pattern chip 191 at the time of inspection before a previous time.

According to the above method, when the adjustment state is deviated due to the lapse of time or a change in environmental conditions, resulting in a possibility that the original inspection performance cannot be obtained, the adjustment using the pattern chip 191 is performed, and the inspection can be performed in a sufficiently adjusted state.

The adjustment using the pattern chip 191 is omitted in the case where it is expected that the deviation of the adjustment state after the previous adjustment time is small enough not to cause any problem. This makes it possible to avoid taking time for adjustment more than necessary and increase the throughput of inspection.

(2) Second Embodiment

Figure 12:
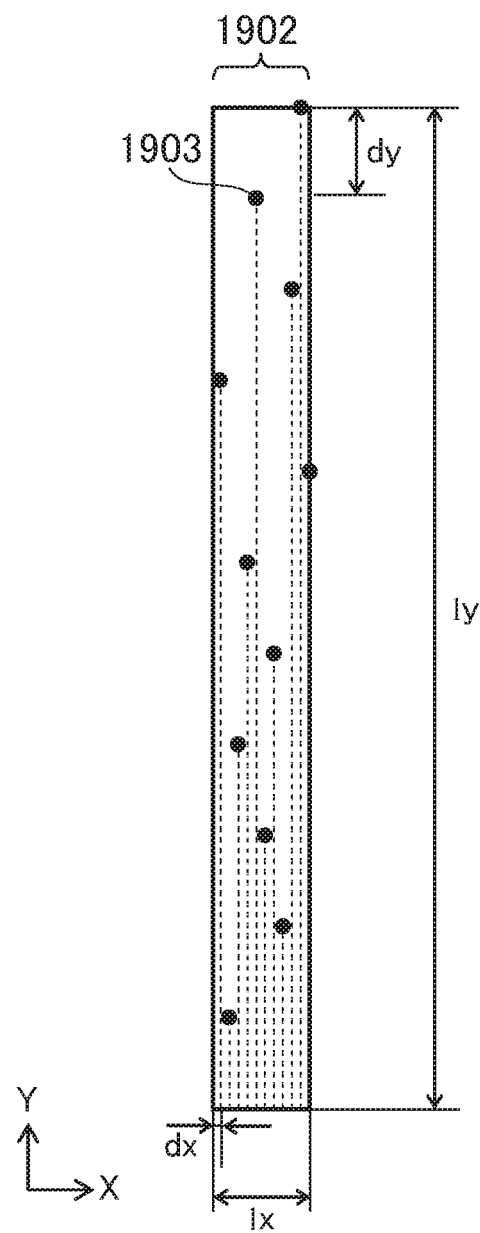
FIG. 12 is a plan view showing a configuration example of a dot pattern area used in a second embodiment.

FIG. 12 shows an example of a dot array of a minimum repetition unit area 1902 configuring a dot pattern area 613 of a pattern chip 191 used in a second embodiment. The configuration is the same as that in the first embodiment except for the configuration of the pattern chip 191. The pattern chip 191 according to the present embodiment is different in the configuration of the dot pattern area 613 from that in the first embodiment.

The structure of individual dots 1903 configuring a minimum repetition unit area 1902, an interval dy of the dots 1903 in the Y direction, and an interval dx in the X direction are the same as those in the first embodiment. In other words, the interval dx of the dots 1903 in the X direction within a range of the minimum repetition unit area 1902 is sufficiently smaller than a width (for example, 0.8 μm) of the illumination area R_I, the interval dy of the dots 1903 in the Y direction and an interval between the closest dots are larger than 1 μm and larger than a spatial resolution of the detection optical system (depending on a wavelength and the number of openings of the detection optical system, for example, 0.7 to 0.9 μm at a wavelength of 266 nm). The dots 1903 in the minimum repetition unit area 1902 are all different in the positions in the Y direction.

After satisfying the above conditions of the dot intervals, the dots 1903 are randomly arrayed at random in the minimum repetition unit area 1902. The term "random" as referred to the present specification means that there is no specific directionality or no specific correlation distance.

Since the dot array satisfying the above conditions has no specific directivity in the scattered light distribution and no deviation corresponding to the specific directionality, there is an advantage that there is little difference in adjustment state of the right and left oblique detection optical systems. Further, as compared with the dot pattern area 613 according to the first embodiment, although dx and dy are; common to the first and second embodiments, since there is no need to provide a mirror image symmetric pattern for canceling the influence of the right and left asymmetry, the length 1y of the minimum repetition unit area 1902Y in the Y direction can be reduced (about half) and the space efficiency is high, which is advantageous.

(3) Third Embodiment

Figure 13:
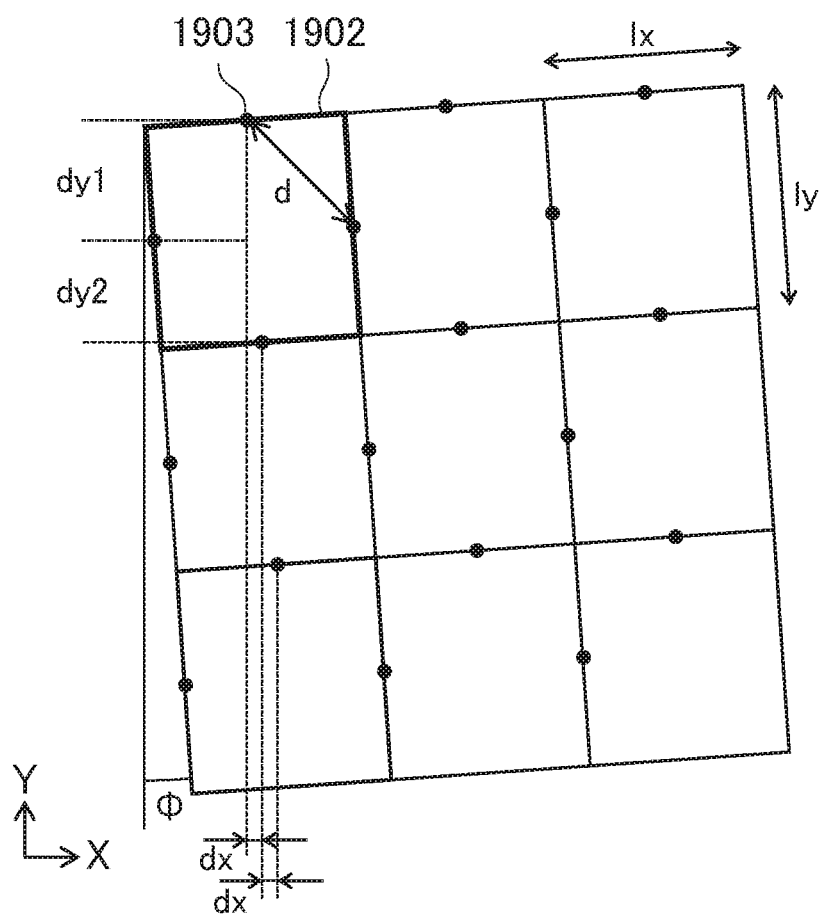
FIG. 13 is a plan view showing a configuration example of a dot pattern area used in a third embodiment.

The present embodiment is also the same as the first embodiment except for the configuration of the pattern chip 191. FIG. 13 shows a dot array example of a minimum repetition unit area 1902 configuring a dot pattern area 613 of a pattern chip 191 used in the third embodiment. The pattern chip 191 according to the present embodiment is different in the configuration of the dot pattern area 613 from that of the first and second embodiments, except that the structure of each dot 1903 is common to that of the first embodiment In the present embodiment, there ere two dots 1903 in the minimum repetition unit area 1902. The present embodiment employs a structure in which the minimum repetition unit area 1902 is repeatedly arrayed in two dimensions in the X and Y directions. In this situation, the dots 1903 are arrayed so that K-fch order diffracted light of the diffraction pattern generated by the oblique illumination light enters the centers of the openings 102B and 102C of the oblique detection optical system.

The minimum repetition unit area 1902 is an oblique lattice obtained by rotating an orientation by $\phi$ relative to an XY lattice (a lattice in which each side is parallel to the X direction and the Y direction), and in the above array, an interval of the dots 1903 in the X direction to an adjacent lattice aligned in the Y direction is dx. As an example, Ix=1.4 µm, 1y=1.5 µm, $\phi$=4 degrees, and dx=0.1 µm are met under the condition that; an K=5th order diffracted light is incident in the vicinity of the center of opening of the oblique detection optical system at the illumination wavelength 266 nm, and dy1 and dy2 are approximately 0.8 µm. The minimum interval d between the dots is 1.0 µm and longer than the spatial resolution of the detection optical system (depending on the wavelength and the number of openings in the detection optical system, for example, 0.7 to 0.9 µm at a wavelength of 266 nm), and therefore overlapping of the signals does not occur between the adjacent dots.

As in the first embodiment, since dx is sufficiently smaller than the width of the illumination area $R_f$, one of the dots 1903 repeated in the Y direction is positioned in the vicinity cf the center of the illumination area $R_f$.

FIG. 14 shows a positional relationship between the diffracted light generated from the dot pattern area 613 due to the oblique, illumination light and the opening of the detection optical system. The pattern of the diffracted light from the dot pattern area 613 is obtained by Fourier transform of the dot array in the dot pattern area 613 centered on a position (0-th order diffracted light 1951) of the regularly reflected light (0-th order diffracted light) of the illumination light. With the dot array under the above conditions, fifth order diffracted lights 1952b and 1952c are incident on the vicinity of the center of the openings 102B and 102C, respectively. The elliptical shape of the diffracted light which is elongated in the X direction in FIG. 14 corresponds to a convergence angle of the illumination light in the X direction and the refracted light has an angular spread in the X direction.

The actual scattering pattern is closer to a distribution obtained by further convolving the diffracted light (scattered light) distribution of the individual dots shown in FIG. 7 with respect to the diffracted light pattern of FIG. 14. Therefore, with the fifth order diffracted light as the center, the spread diffracted light (scattered light) distribution is incident on the vicinity of the center of the oblique detection optical system, thereby being capable of obtaining the dot detection signal with a sufficient intensity for the oblique detection optical systems (170b, 170c).

(4) Other Embodiments

The present invention is not limited to the embodiments described above, but the present invention includes various modifications. For example, the above-described embodiments are described in detail for clarifying the present invention and not always limited to the provision of all the configurations described above. Further, a part of one embodiment configuration can be replaced with another embodiment configuration, and the configuration of one embodiment can be added with the configuration of another embodiment. Also, in a part of the respective embodiment configurations, another embodiment configuration can be added, deleted, or replaced.

Control lines and information lines shown are considered to be necessary for description. All control lines and information lines are not necessarily required for: products. It may be considered that almost all of the components are interconnected actually.

LIST OF REFERENCE SIGNS

101 . . . light source unit
102 . . . objective lens,
103 . . . objective pupil optical unit,
104 . . . polarizer,
105 . . . imaging lens,
106 . . . detector,
108 . . . mirror,
109 . . . two-dimensional detector,
110 . . . mirror,
111 . . . TTL illumination optical system,
112 . . . oblique illumination optical system,
113 . . . mirror,
151 . . . stage drive unit,
152 . . . X-Y-Z-θ stage,
170a . . . vertical detection optical system,
170b . . . right oblique detection optical system,
170c . . . left oblique detection optical system,
191 . . . pattern chip,
200 . . . signal processing unit,
301 . . . overall control unit,
302 . . . display unit,
303 . . . arithmetic unit,
304 . . . storage unit,
601 . . . pattern area,
602 . . . small pattern area,
611 . . . one alignment pattern area,
612 . . . line and space pattern area,
613 . . . dot pattern area,
1902 . . . minimum, repetitive unit area,
1903 . . . dot

The invention claimed is:

1. A defect inspection device comprising:
a pattern chip comprising a plurality of dots;
a table unit for holding a sample to be inspected and upon which the pattern chip is installed;
a light source that emits an illumination light that irradiates a surface of the sample or a surface of the pattern chip with an illumination light shaped to extend in a first direction;
a detection optical system that detects a diffracted light and a scattered light generated from the surface of the sample or the surface of the pattern chip by the illumination light, the detection optical system comprising an objective lens and an image sensor; and
a signal processor configured to adjust a focus of the detection optical system and to detect a defect on the surface of the sample based on a signal output from the detection optical system,
wherein the pattern chip has a dot pattern area in which the plurality of dots are arrayed in a plurality of rows and a plurality of columns, a minimum interval between the dots corresponding to the lines aligned in the first direction among the plurality of dots arrayed in the dot pattern area in a second direction orthogonal to the first direction is smaller than a width of the illumination light, and a minimum interval between the plurality of dots arrayed in the dot pattern area is larger than a resolution of the detection optical system, wherein said plurality of dots of said dot pattern area are further arranged as a repeating plurality of smaller dot pattern areas each having a different area on said surface of said pattern chip, and
wherein said repeating plurality of smaller dot pattern areas repeat in said first direction.

2. The defect inspection device according to claim 1, wherein a shape of the dots is round.

3. The defect inspection device according to claim 1, wherein a diameter of the dots is smaller than a resolution of the detection optical system.

4. The defect inspection device according to claim 1, wherein a minimum interval between the plurality of dots appearing on the same row among the dots configuring the dot pattern area is larger than a width of the illumination light.

5. The defect inspection device according to claim 1, wherein the dots have a concave pattern.

6. The defect inspection device according to claim 1, wherein the pattern chip further includes a one-row dot pattern configured by a pattern in which the dots are aligned in one row, and the dot pattern area and the one-row dot pattern are arranged in different areas in the first direction.

7. A pattern chip that is placed on a table unit of a defect inspection device and irradiated with an illumination light shaped to extend in a first direction, the pattern chip comprising:
a dot pattern area in which a plurality of dots are arrayed in a plurality of rows and a plurality of columns,
wherein a minimum interval between the dots corresponding to the lines aligned in the first direction among the plurality of dots arrayed in the dot pattern area in a second direction orthogonal to the first direction is smaller than a width of the illumination light,
wherein a minimum interval between the plurality of dots arrayed in the dot pattern area is larger than a resolution of a detection optical system,
wherein said plurality of dots of said dot pattern area are further arranged as a repeating plurality of smaller dot pattern areas each having a different area on a surface of said pattern chip, and
wherein said repeating plurality of smaller dot pattern areas repeat in said first direction.

8. The pattern chip according to claim 7, wherein a shape of the dots is round.

9. The pattern chip according to claim 7, wherein a diameter of the dots is smaller than a resolution of the detection optical system.

10. The pattern chip according to claim 7, wherein a minimum interval between the plurality of dots appearing on the same row among the dots configuring the dot pattern area is larger than a width of the illumination light.

11. The pattern chip according to claim 7, wherein the dots have a concave pattern.

12. The pattern chip according to claim 7, wherein only one dot is present at the same position with respect to the second direction within a minimum repetition unit area defined by a first length in the first direction and a second length in the second direction being longer than the first length.

13. A method of inspecting a defect comprising:
a step of irradiating a surface of a pattern chip with an illumination light shaped to extend in a first direction;
a step of detecting a diffracted light and a scattered light generated from the surface of a sample or the surface of the pattern chip by irradiation of the illumination light using a detection optical system having an objective lens and an image sensor;
a step of adjusting a focus of the detection optical system based on detection signals corresponding to the refracted light and the scattered light generated from the surface of the pattern chip; and
a step of detecting a defect on the surface of the sample based on detection signals corresponding to the refracted light and the scattered light generated from the surface of the sample,
wherein the pattern chip has a dot pattern area in which a plurality of dots are arrayed in a plurality of rows and a plurality of columns, a minimum interval between the dots corresponding to the lines aligned in the first direction among the plurality of dots arrayed in the dot pattern area in a second direction orthogonal to the first direction is smaller than a width of the illumination light, and a minimum interval between the plurality of dots arrayed in the dot pattern area is larger than a resolution of the detection optical system,
wherein said plurality of dots of said dot pattern area are further arranged as a repeating plurality of smaller dot pattern areas each having a different area on said surface of said pattern chip, and
wherein said repeating plurality of smaller dot pattern areas repeat in said first direction.

14. The method of inspecting a defect according to claim 13, wherein a shape of the dots is round.

15. The method of inspecting a defect according to claim 13, wherein a diameter of the dots is smaller than a resolution of the detection optical system.

16. The method of inspecting a defect according to claim 13, wherein a minimum interval between the plurality of dots appearing on the same row among the dots configuring the dot pattern area is larger than a width of the illumination light.

17. The defect inspection device according to claim 1, wherein only one dot is present at the same position with respect to the second direction within a minimum repetition unit area defined by a first length in the first direction and a second length in the second direction being longer than the first length.

18. The method of inspecting a defect according to claim 13, wherein only one dot is present at the same position with respect to the second direction within a minimum repetition unit area defined by a first length in the first direction and a second length in the second direction being longer than the first length.

* * * * *